Nov. 13, 1962 R. R. GRAVES 3,063,211
STERILIZED LIQUID FOOD PRODUCT PACKAGING
Filed June 21, 1960 8 Sheets-Sheet 1
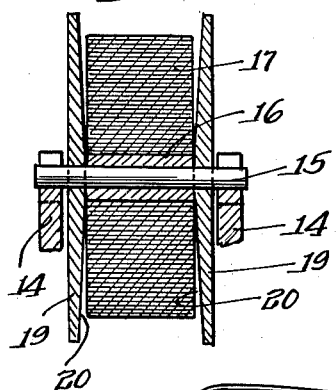
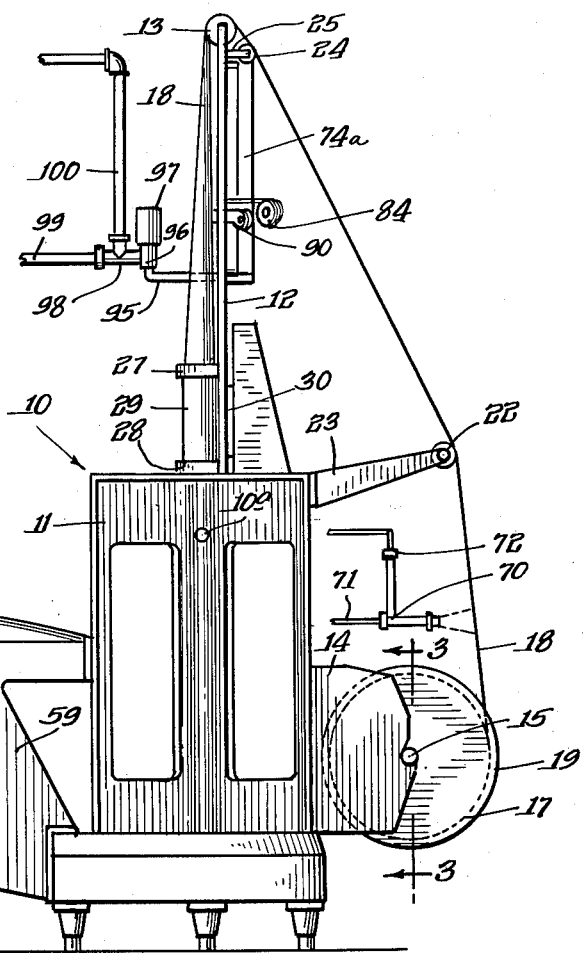
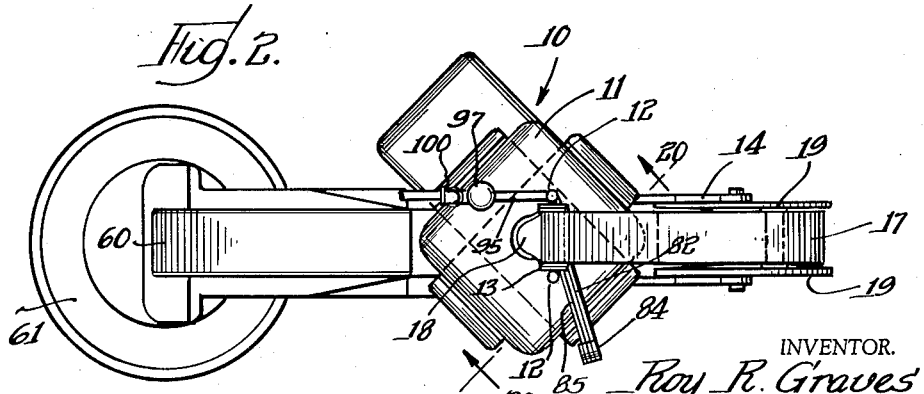
INVENTOR.
Roy R. Graves
BY
Wallenstein & Spangenberg
attys.

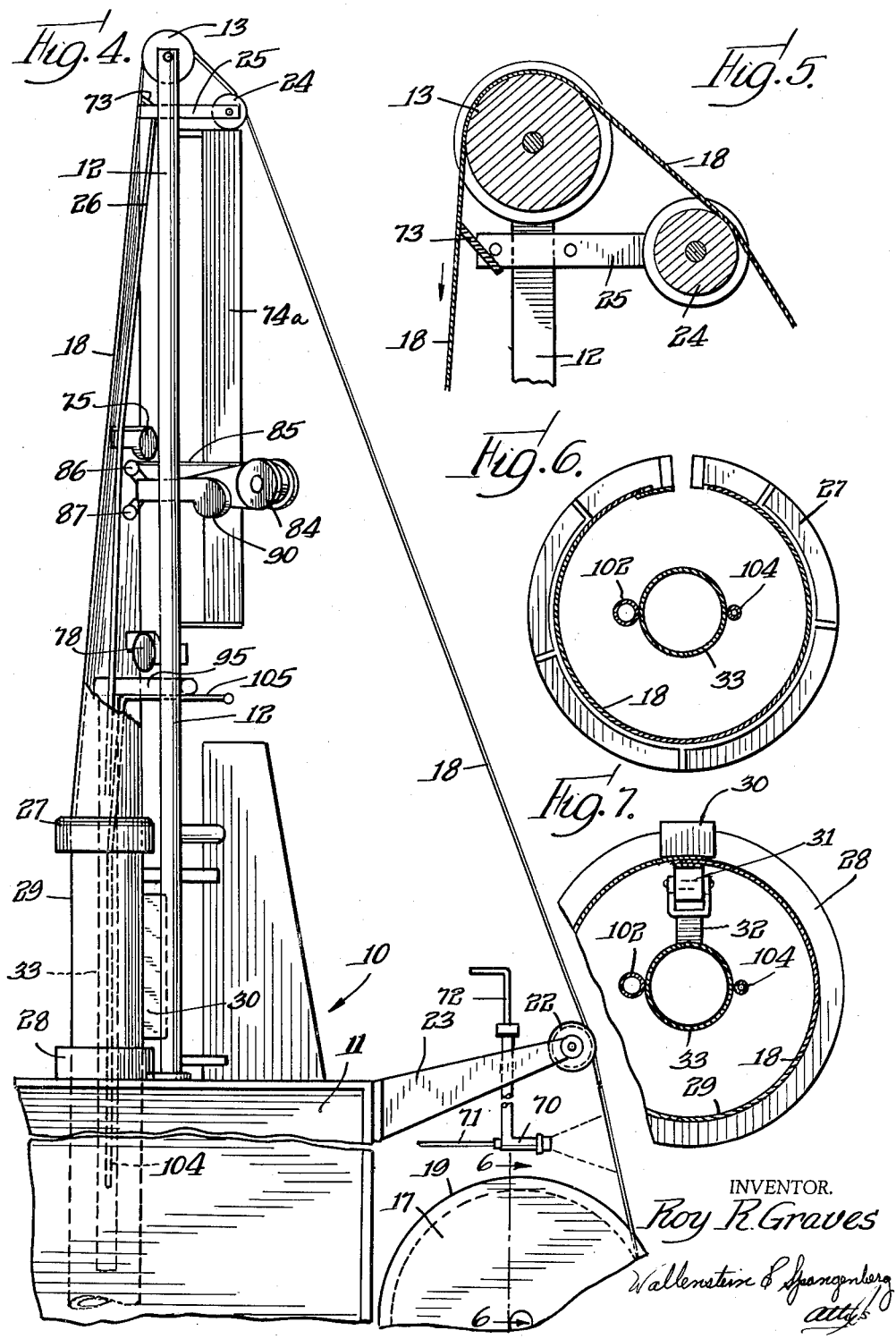

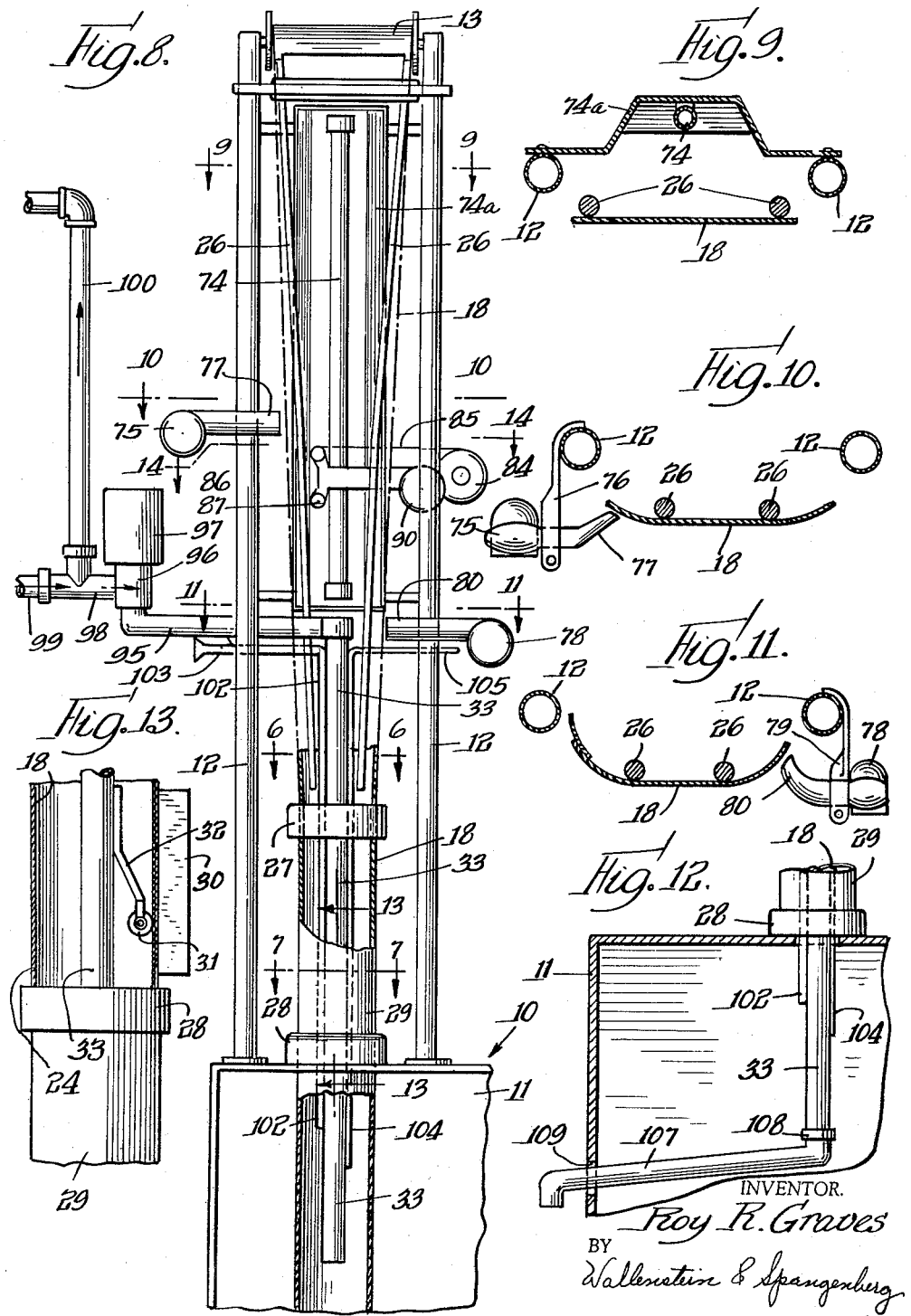

Nov. 13, 1962  R. R. GRAVES  3,063,211
STERILIZED LIQUID FOOD PRODUCT PACKAGING
Filed June 21, 1960  8 Sheets-Sheet 4
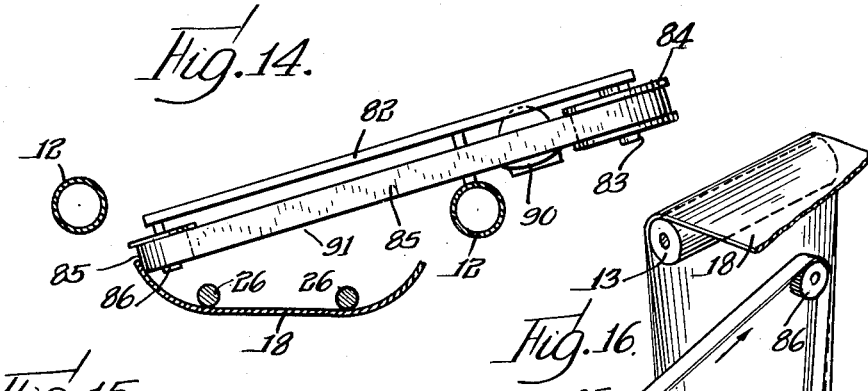
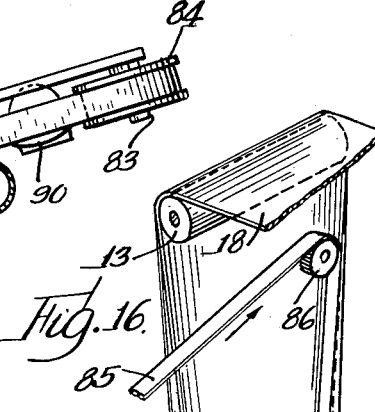
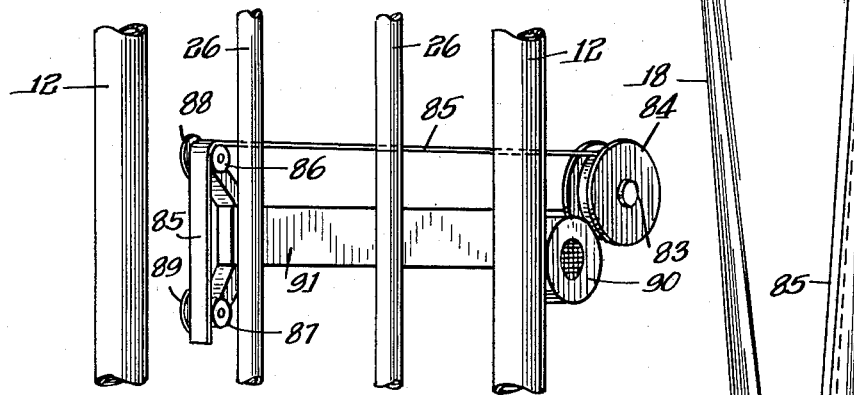
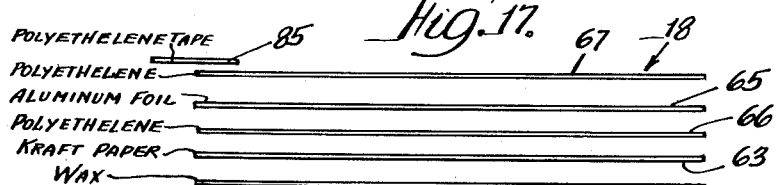
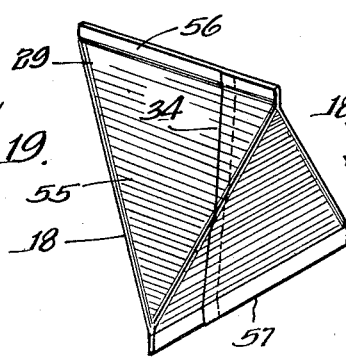
INVENTOR.
Roy R. Graves
BY
Wallenstein & Spangenberg
Attys Nov. 13, 1962 R. R. GRAVES 3,063,211
STERILIZED LIQUID FOOD PRODUCT PACKAGING
Filed June 21, 1960 8 Sheets-Sheet 5
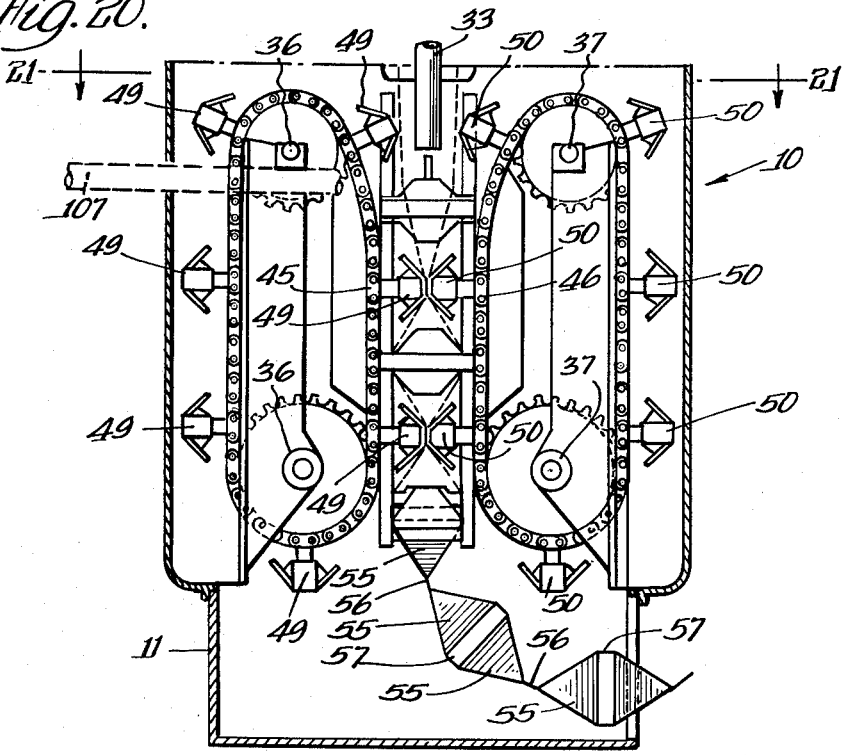
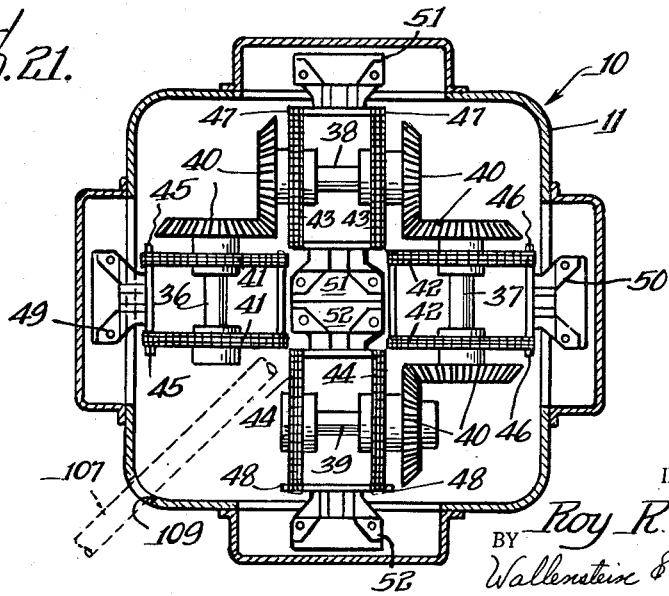
INVENTOR.
Roy R. Graves
BY Wallenstein & Spangenberg
attys

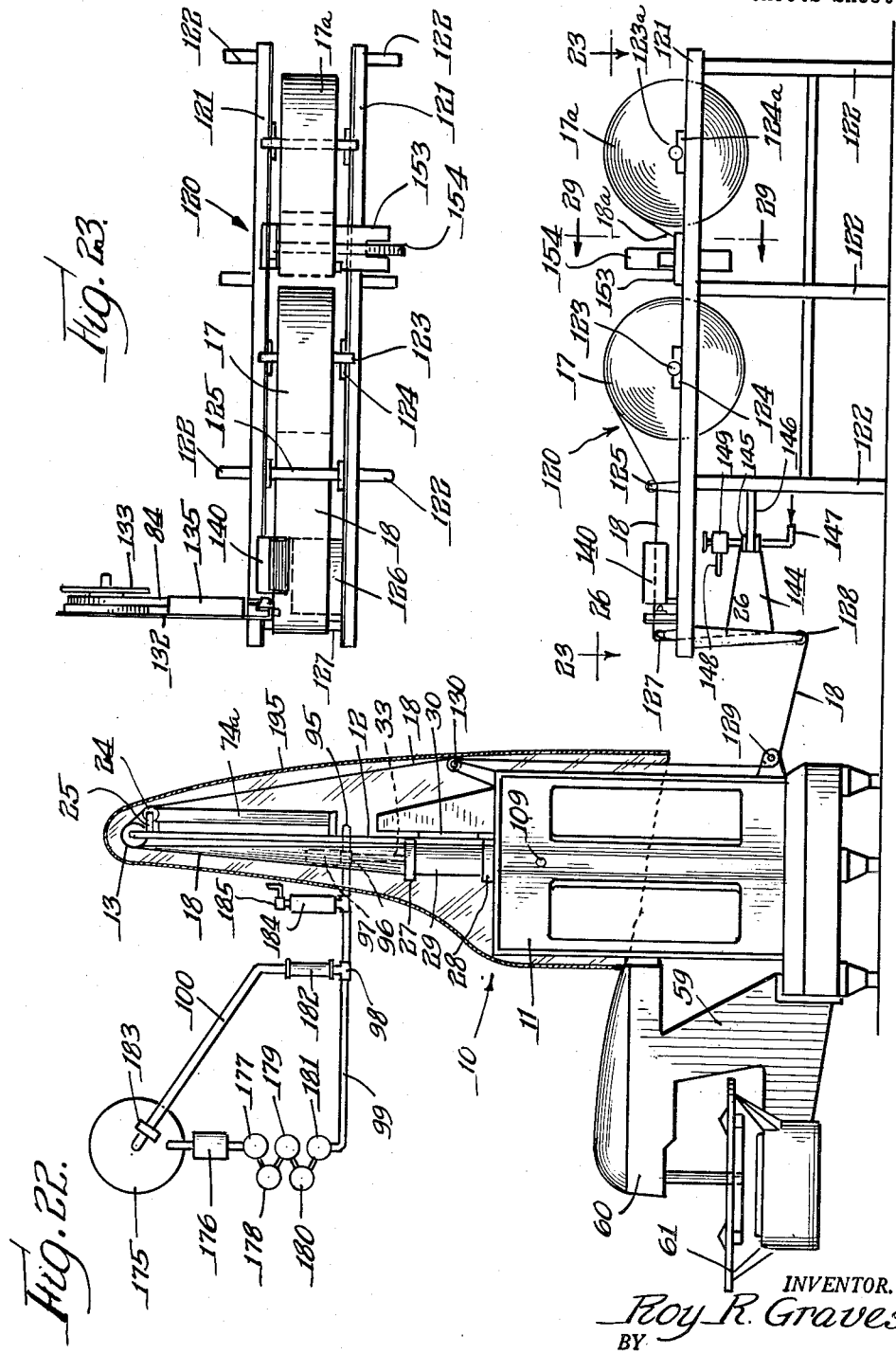

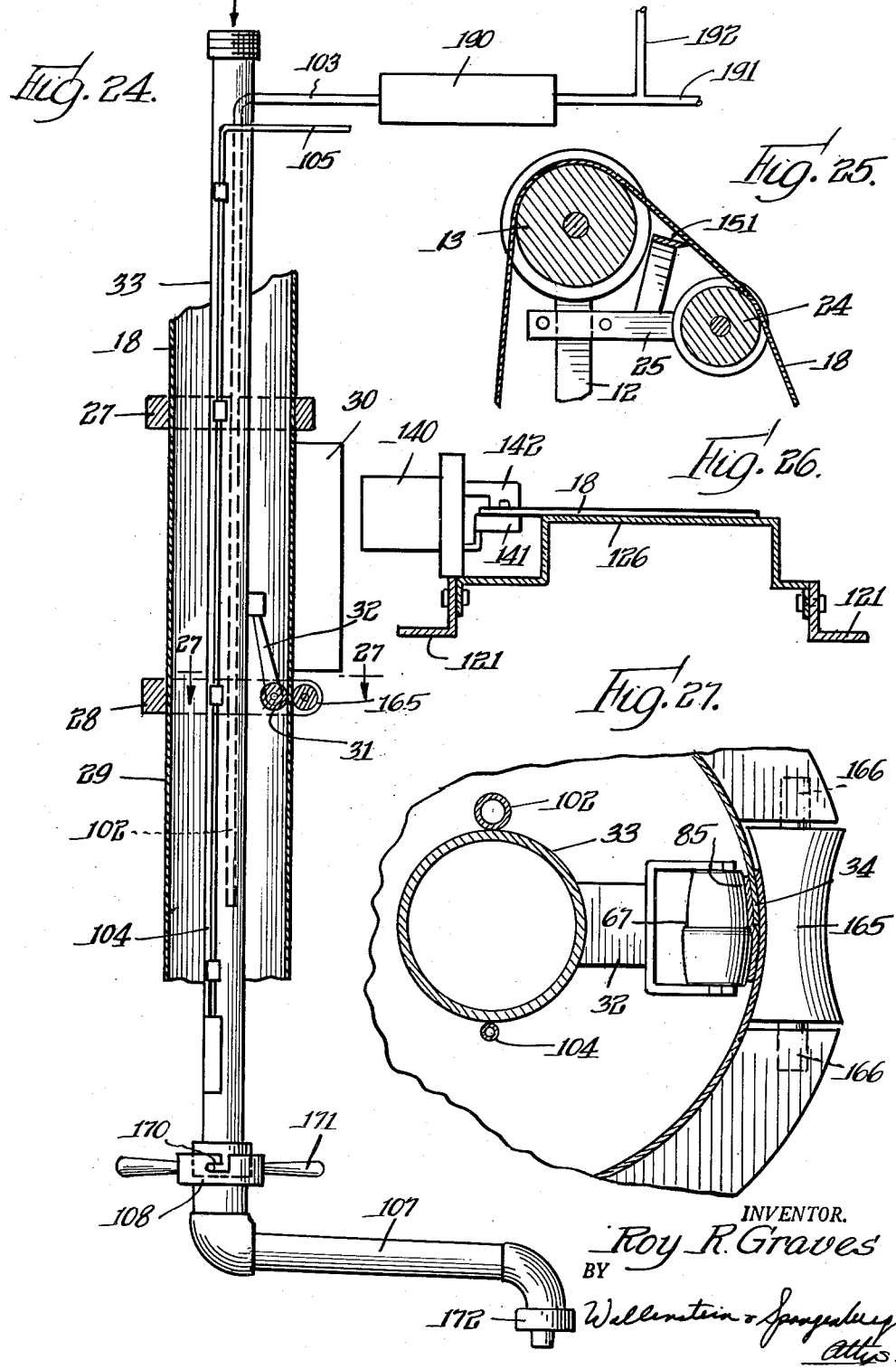

Nov. 13, 1962   R. R. GRAVES   3,063,211
STERILIZED LIQUID FOOD PRODUCT PACKAGING
Filed June 21, 1960   8 Sheets-Sheet 8
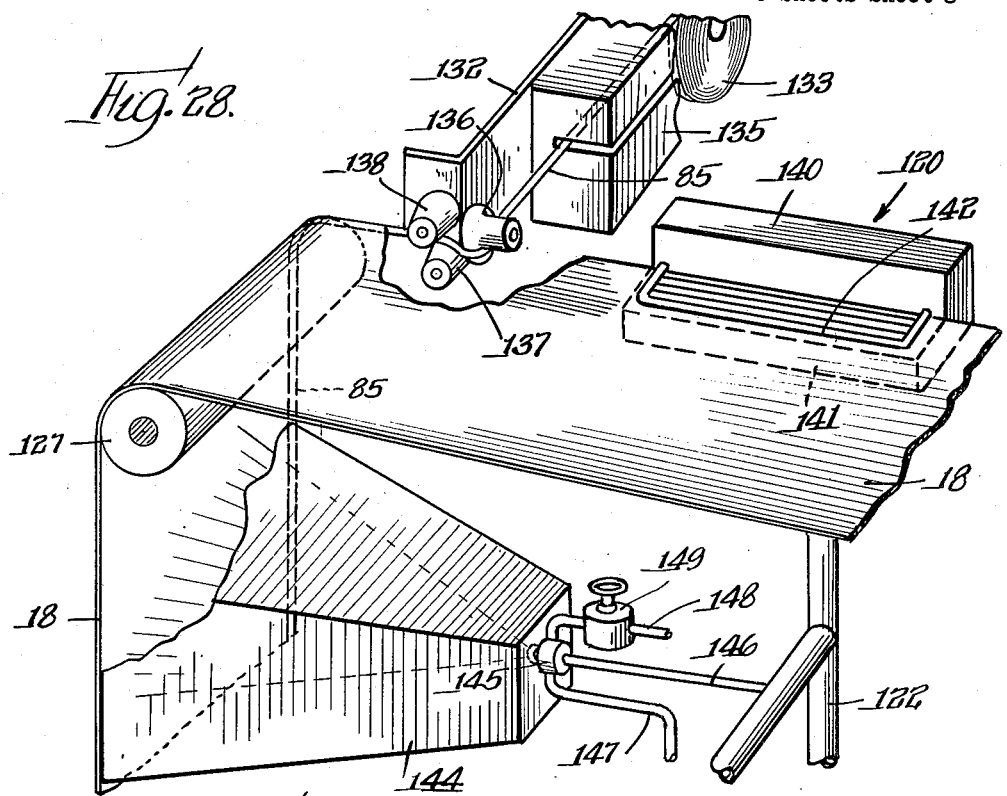
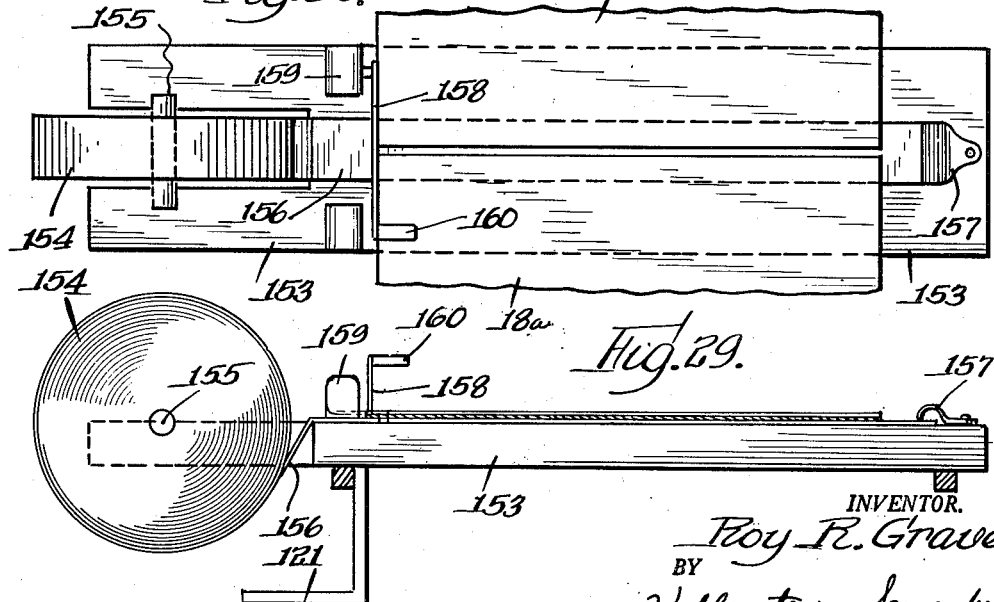
INVENTOR.
Roy R. Graves
BY
Wellenstein + Spangenberg
Attys.

United States Patent Office 3,063,211
Patented Nov. 13, 1962

3,063,211
STERILIZED LIQUID FOOD PRODUCT
PACKAGING
Roy R. Graves, Germantown, Md., assignor to The Graves-Stambaugh Corporation, a corporation of Delaware
Filed June 21, 1960, Ser. No. 37,667
14 Claims. (Cl. 53—180)

This application is a continuation in part of my copending application, Serial Number 757,023, filed August 25, 1958, and the principal object of this invention is to provide an apparatus for producing a gas and liquid impervious formable type package having aseptically packaged therein for long time keeping without refrigeration a sterilized liquid food product which is subject to deterioration upon contact with extraneous oxygen.

The liquid food product may be any desired product, such as a fruit product, a vegetable product, a milk product or the like, and the latter may be whole milk, cream, skim milk, concentrates, mixes, formulae or the like. The liquid food product may be provided with a low oxygen content in any desired manner as by processing it in the absence of air and removing oxygen by deaerating or the like. It may be sterilized in any desired manner, as by continuous short time-high temperature heat treatment. One manner of processing the liquid food product, such as a milk product, to sterilize the same by heat treatment and produce a low oxygen content therein, so that it may be kept for a long time without refrigeration and without deterioration, is disclosed in Roy R. Graves Patent No. 2,772,979, issued December 4, 1956. As shown in that patent it has been the practice to aseptically package the low oxygen content liquid food product in heat sterilized cans, the cans effectively preventing extraneous oxygen from contacting the liquid food product therein so as to provide long shelf life. However, due to the high and rising costs of cans, the resultant cost of the packaged liquid food product has become comparatively high. Also, the heat sterilizing of the cans, the cans being hot when they are aseptically filled with the sterile liquid food product, has caused somewhat of a cooked flavor in the packaged product.

Packaging of liquid food products in paper type containers has been done for years on a large scale and has proven to be an inexpensive manner of marketing such products. Many different packaging methods of this kind have been followed, one such method being disclosed in R. Rausing Patent No. 2,741,079, issued April 10, 1956 and Harry S. V. Jarund Patent No. 2,738,631, issued March 20, 1956. These patents disclose a method of continuously forming paper type packages and of continuously filling the packages, as they are formed, with a liquid food product, an extremely efficient packaging method. However, this method of packaging liquid food products in paper type containers, and other such known methods, are not capable of aseptically packaging for long time keeping without refrigeration a sterilized liquid food product which is subject to deterioration upon contact with extraneous oxygen, and they have not been utilized for this purpose for the reasons that heat treatment and sterilization problems, aseptic packaging problems and problems of effectively preventing extraneous oxygen from contacting the liquid food product in the packages have been substantially insurmountable.

By reason of the instant invention, the foregoing problems and deficiencies have been solved and remedied and it is now possible, by reason of this invention, to commercially aseptically package for long time keeping without refrigeration a sterilized liquid food product having low oxygen content and which is subject to deterioration upon contact with extraneous oxygen in formable type, such as paper type containers. As a result, a low cost packaged product with minimum cooked flavor is made possible.

Briefly, this invention contemplates the production of sterile and gas and liquid impervious paper type packages and the aseptic filling of such packages with said sterilized liquid food product in an uncontaminated gas atmosphere, such as nitrogen, which is non-toxic and which does not react unfavorably with the food product or package. Further objects of this invention reside in the construction of the apparatus for producing such packages and the aseptic filling of the same.

Other objects and advantages of this invention will become apparent to those skilled in the art upon reference to the accompanying specification, claims and drawings in which:

FIG. 1 is a side elevational view of a packaging machine, which may be of the type disclosed in the aforementioned Patent Nos. 2,741,079 and 2,738,631, showing features of the instant invention applied thereto.

FIG. 2 is a top plan view of the machine illustrated in FIG. 1.

FIG. 3 is a sectional view taken substantially along the line 3—3 of FIG. 1.

FIG. 4 is an enlarged elevational view of the upper portion of the machine illustrated in FIG. 1.

FIG. 5 is an enlarged sectional view through the top part of the machine illustrated in FIGS. 1 and 4.

FIG. 6 is a horizontal sectional view taken substantially along the line 6—6 of FIG. 8.

FIG. 7 is a horizontal sectional view taken substantially along the line 7—7 of FIG. 8.

FIG. 8 is a side elevational view of the upper portion of the machine looking from the left of FIG. 4.

FIG. 9 is a horizontal sectional view taken substantially along the line 9—9 of FIG. 8.

FIG. 10 is a horizontal sectional view taken substantially along the line 10—10 of FIG. 8.

FIG. 11 is a horizontal sectional view taken substantially along the line 11—11 of FIG. 8.

FIG. 12 is a partial vertical sectional view through a portion of the machine illustrated in FIGS. 1, 4 and 8.

FIG. 13 is a vertical sectional view taken substantially along the line 13—13 of FIG. 8.

FIG. 14 is a horizontal sectional view taken substantially along the line 14—14 of FIG. 8.

FIG. 15 is a partial elevational view of the apparatus illustrated in FIG. 14.

FIG. 16 is a diagrammatic perspective view showing the manner of forming the tube from the formable paper like strip.

FIG. 17 is an exploded view showing the composition of the laminate of the formable paper like strip.

FIG. 18 is a partial sectional view showing the longitudinal seam of the formable paper like tube.

FIG. 19 is a perspective view of the ultimate filled package.

FIG. 20 is a vertical sectional view through the bottom portion of the machine as illustrated in FIGS. 1 and 2 and taken substantially along the line 20—20 of FIG. 2.

FIG. 21 is a horizontal sectional view taken substantially along the line 21—21 of FIG. 20.

FIG. 22 is a side elevational view of the packaging machine illustrated in FIG. 1, but illustrating modified features of the instant invention applied thereto.

FIG. 23 is a top plan view of a portion of the machine illustrated in FIG. 22 as viewed along the line 23—23 of FIG. 22.

FIG. 24 is a side elevational view of a portion of the machine illustrated in FIG. 22.

FIG. 25 is a sectional view through the top portion of the machine illustrated in FIG. 22.

FIG. 26 is a sectional view taken substantially along the line 26—26 of FIG. 22.

FIG. 27 is a sectional view taken substantially along the line 27—27 of FIG. 24.

FIG. 28 is a perspective view of a portion of the machine as illustrated in the lower right hand portion of FIG. 22.

FIG. 29 is a sectional view taken substantially along the line 29—29 of FIG. 22.

FIG. 30 is a plan view of the portion of the machine illustrated in FIG. 29.

Referring first to FIGS. 1, 2, 4 and 8, one form of a packaging machine is generally designated at 10, this machine corresponding generally to the packaging machine disclosed in the aforementioned Patent Nos. 2,741,079 and 2,738,631. It includes a main housing 11 and a vertical frame 12 extending upwardly therefrom, the frame 12 including a pair of upright posts. A guide roll 13 is rotatably mounted at the top of the frame 12. On one side of the frame 12 and at a position therebelow the housing 11 is provided with a bracket 14 which rotatably carries a shaft 15 upon which is mounted a sleeve 16 of a roll 17 comprising a strip 18 of a gas and liquid impervious formable paper like material, the construction of which will be pointed out more fully hereafter. Also mounted on the shaft 15 is a pair of discs or collars 19, one on each side of the roll 17. The inner surfaces of the discs 19 are tapered as indicated at 20, and these discs operate to guide the roll 17 and the strip 18 being unrolled therefrom.

The formable paper like strip 18 extends upwardly along one side of the vertical frame 12 from the roll 17 over a roller 22 carried by a bracket 23 and a roller 24 carried by a bracket 25 to the guide roll 13 and then downwardly along the other side of the vertical frame 12. A pair of depending rods 26 extending downwardly along the vertical frame 12 and converging toward their bottoms are engaged by the descending formable paper like strip 18 to aid in forming the strip 18 into a tubular configuration, a tube being formed by an upper forming ring 27 and a lower forming ring 28. The formable paper like tube, formed from the paper like strip 18, is designated at 29. The side of the formable paper like strip which faces the vertical frame 12 and which forms the inside of the formable paper like tube 29 is coated with a thermoplastic and the edges of the formable paper like strip overlap each other as the tube 29 is so formed. Between the upper and lower forming rings 27 and 28 is a heater 30, and a roller 31, carried by a spring arm 32 secured to the liquid food product filling pipe 33, presses the overlapping edges of the tube 29 against the heater 30 for heat sealing the edges together. Thus, the heater 30 and the spring pressed roller 31 form a longitudinal heat sealing means for longitudinally heat sealing the overlap seam of the tube 29, the longitudinal heat sealed seam being designated at 34. The heat sealed tube 29 continuously descends into the housing 11 where the formation of the packages and the filling of the packages are accomplished.

The mechanism for so doing is illustrated in FIGS. 20 and 21. A plurality of shafts 36, 37, 38 and 39 are journaled within the housing 11 and they are suitably driven, as by gears 40. The shafts 36, 37, 38 and 39 respectively carry sprocket wheels 41, 42, 43 and 44 which in turn respectively carry chains 45, 46, 47 and 48. The chains 45 and 46 carry a plurality of heat sealing devices 49 and 50 and the chains 47 and 48 carry a plurality of heat sealing devices 51 and 52. The heat sealing devices 50 and 51 are provided with heating elements and these heat sealing devices are brought against their opposite heat sealing devices 49 and 52 at the center of the housing 11 as the chains are advanced by their sprocket wheels. In so doing, the heat sealing devices transversely grip the descending formable paper like tube 29 so as to transversely heat seal the paper like tube at intervals to form tetrahedron shaped packages 55 as shown in FIGS. 19 and 20. The transverse heat seals formed by the transverse heat sealing devices 49 and 50 are designated at 56 and the transverse heat seals formed by the transverse heat sealing devices 51 and 52 are designated at 57. The filling pipe 33 extends downwardly through the formable paper like tube 29 into the housing 11 and the liquid food product is continuously supplied into the formable paper like tube 29 at a point just above the formation point of the transverse heat seals. As a result, the packages formed by the apparatus illustrated in FIGS. 20 and 21 are simultaneously filled, during the forming, with the liquid food product. The filled tetrahedron packages are conveyed by a conveyor 59 (FIGS. 1 and 2) to a mechanism 60 where the packages are separated along the transverse heat seals 56 and 57 and discharged into suitable packing receptacles carried by a turn table 61. The machine thus far described corresponds to the machines of the aforementioned Patents 2,741,079 and 2,738,631 and, per se, is not the invention of applicant, with the exception of the tapered discs 19 for guiding the roll 17 and the formable paper like strip 18.

In order to package for long time keeping without refrigeration a heat treated liquid food product, such as a sterilized liquid food product which is subject to deterioration upon contact with extraneous oxygen, it is necessary to provide a package which is impervious to gas and liquid so that the package will not deteriorate because of the liquid contained therein and will not breathe so as to allow extraneous oxygen to contact the food product therein. In this respect, one form of gas and liquid impervious formable type package, which has proven to be particularly successful, consists of a laminate which is illustrated in FIG. 17. There, the formable paper like strip 18 includes an outer kraft paper layer 63 which is coated on its outside with wax 64 and an inner layer of metal foil 65, such as aluminum foil, which is adhered to the outer kraft paper layer, as by heat sealing with a thermoplastic material, such as polyethylene. The inner surface of the metal foil 65 of the laminate is coated with a thermoplastic 67, such as polyethylene. The metal foil and paper laminate is so arranged in the roll 17 that the inner metal foil portion thereof faces the vertical frame 12 as it ascends and descends and so that the inner metal foil portion forms the inside of the formable tube 29. Since the metal foil layer is coated with thermoplastic, the liquid food product within the package does not directly contact the metal foil and the heat sealing of the packages is readily accomplished. The metal foil paper laminate provides a sturdy formable package for the liquid food product which may be readily handled and shipped and it provides a package which is substantially free from wetting by the liquid food product therein and from breathing so that the extraneous oxygen does not contact the liquid food product in the package. All of this is accomplished at relatively low cost, considerably cheaper than the cost of metal cans and the like.

Because the liquid food product being packaged is a sterilized product and must be maintained substantially sterile, the formable paper like laminate strip 18 must also be sterilized. However, the usual heat sterilization cannot be conveniently utilized because of the detrimental effects of heat upon the laminate. In accordance with this invention the laminate strip 18 is sterilized by subjecting the same to sterilizing chemicals and sterilizing rays. As shown in FIGS. 1 and 4, a spray nozzle 70 is located adjacent the roll 17 and operates to spray a sterilizing chemical upon the plastic coated metal foil side of the laminate strip 18 which faces the vertical support 12 and which forms the inside of the tube 29. The sterilizing chemical is supplied to the spray nozzle 70 through a pipe 71 and the spraying of the sterilizing chemical on the laminate strip is afforded by compressed air supplied to the spray nozzle 70 through a pipe 72.

Any suitable sterilizing chemical may be utilized, such as chlorine compounds, iodine compounds or quaternary ammonium compounds. Especially good results have been obtained by using hypochlorites, such as calcium hypochlorite and sodium hypochlorite, as the sterilizing chemical. The hypochlorites are less selective in their activity against a wide variety of bacteria than are the iodoforms or the quaternaries. They rapidly destroy coliforms, thermodurics, psychrophilics, spores and bacterio-phages. Their efficiency is not as greatly affected by calcium or magnesium ions as the iodoforms. These chlorine compounds do not have any adverse effect on the polyethylene coating, at least they do not have any adverse effect when the exposure is for extended periods of time. Experiments demonstrate that the hypochlorites completely inactivate Streptococcus cremoris phage in 15 seconds at 50 p.p.m., in 30 seconds at 25 p.p.m. The concentration of the hypochlorites may be increased to at least 500 p.p.m. without harmful effects so that complete chemical sterilization may be afforded. A few organisms, such as Pseudomonas fluorescens, are resistant to the acton of hypochlorite chemicals, but the addition of 1.35 to 4.0 percent crystalline sodium bromide to the hypochlorite solution makes the same effective with respect to such organisms and greatly increases the effectiveness of the sterilizing chemical. Preferably, the sterilizing hypochlorite chemical is sprayed onto the polyethylene coated metal foil side of the laminate strip in a fine spray or fog so as to completely wet the surface with the chemical. The spray nozzle 70 is preferably of the stainless steel type so as to be resistant to the corrosive action of the chlorine. By so wetting the polyethylene coated surface of the laminate strip 18 immediately after it clears the roll 17 with a uniform covering of the fine spray, the sprayed surface will be exposed to the action of the sterilizing chemical until the laminate strip moves over the top roll 13. Since the laminate strip is under pressure when going over the roll 13 and due to the fact that the polyethylene coated side of the laminate strip contacts the roll surface, the sterilizing chemical solution is ironed off at that point, at least to a considerable degree. If any sterilizing solution remains upon the laminate strip 18 after it passes over the roll 13, it is wiped therefrom by a squeegee 73 located adjacent the roll 13. It takes substantially 25 to 30 seconds for the laminate strip 18 to travel from the roll 17 to the roll 13 which is adequate time for the hypochlorite solution to completely sterilize the polyethylene side of the laminate strip by the time it leaves the top roll 13.

There is still the problem of maintaining the polyethylene coated side of the laminate strip sterile until the time the packages are formed, filled and sealed some time later. One way of overcoming reinfection would be to house the machine in a closed room where all air is filtered and sterilized but this would be a comparatively expensive method. It has been found that reinfection can be avoided by exposing the sterilized side of the laminate strip to sterilizing rays as it descends from the top roll 13 to the point where the packages are formed and filled. Towards this end, a sterilizing lamp 74, such as an ultra-violet germicidal lamp, is carried by the vertical frame 12, this lamp being provided with a reflector 74a for concentrating the sterilizing rays on the sterile surface of the descending laminate strip. These sterilizing rays operate to kill any airborne or other bacteria that may have come in contact with the sterile surface of the laminate strip after it left the upper roll 13. If desired, an additional sterilizing lamp may be arranged below the lamp 74 so as to insure against any possible reinfection. The germicidal lamp or lamps have a temperature near the walls thereof of approximately 110 degrees F. and the heat therefrom operates to dry any sterilizing chemical on the laminate strip after it has passed over the upper roll 13.

In order to insure a strong longitudinal seam 34 in the tube 29 and the resulting packages 55 it is desirable to have the overlapping edges of the laminate strip 18 completely dry so that they may be readily heat sealed together. Towards this end, a blower 75 is carried by a bracket 76 secured to the vertical frame 12 (FIG. 10) and is provided with a nozzle portion 77 for directing a blast of hot air on one edge of the laminate strip 18. Another blower 78 (FIG. 11) is secured to the vertical frame 12 by a bracket 79 and is provided with a nozzle portion 80 for directing a blast of hot air against the other edge of the laminate strip 18. These blasts of hot air thoroughly dry the edges of the laminate strip to aid in the formation of the strong longitudinal heat seal seam 34. The air is preferably heated to a temperature in excess of 300 degrees F. and since the air is also subjected to the sterilizing rays of the germicidal lamp, reinfection of the sterilized surface during this drying operation is entirely prevented.

To strengthen the longitudinal seam 34, it is also preferable to reinforce the seam with an additional thermoplastic tape such as a polyethylene tape 85, and the manner of so doing is illustrated in FIGS. 8 and 14 to 19. Here, a bracket 82 is suitably secured to the vertical frame 12 and is provided at one end with a pin 83 for rotatably supporting a roll 84 of polyethylene tape 85. The tape 85 extends over a pair of rolls 86 and 87 carried by the other end of the bracket 82, these rolls 86 and 87 having guide flanges 88 and 89 for guiding the tape. A blower 90 is also carried by the bracket 82 and it has a nozzle portion 91 for directing hot air against the tape 85 for heating the same. The rolls 86 and 87 press the heated polyethylene tape 85 against one edge of the polyethylene coated side of the laminate strip 18 and as shown, the tape overhangs the edge. In this way, the tape is secured by heat sealing to the laminate strip. Here, the temperature of the air directed onto the tape is in excess of 300 degrees F. and the air is subjected to the sterilizing rays of the germicidal lamp so that reinfection of the sterilized laminate strip is prevented. When the longitudinal heat seal seam 34 is formed by the longitudinal heat sealing means 30, 31 and 32 as shown in FIGS. 7 and 13, the thermoplastic tape 85 is heat sealed in the seam and overlaps the same as shown in FIG. 18. Thus, the longitudinal heat seal seam is strongly reinforced and danger of breathing entirely eliminated. Because of the heavy nature of the laminate strip 18 high temperatures up to 600 degrees F. and even higher so long as there is no burning of the exterior kraft paper of the strip. Instead of forming the seams or seals 34, 56 and 57 by heat sealing, they could be formed by ultrasonic welding which is very effective where metal foils are involved.

The heat treated or sterilized liquid food product of low oxygen content and which is subject to deterioration by contact with extraneous oxygen may be produced, as expressed above, in accordance with the teachings of Roy R. Graves Patent No. 2,772,979 and may be supplied to the filling line 33 by a supply conduit 95 connected to the upper end thereof and extending outwardly between the edges of the laminate strip 18 as it is being formed into the tube 29. The sterilized liquid food product is supplied to the supply conduit 95 through a valve 96 operated by a solenoid 97 and a T-fitting 98 from a supply line 99. A diversion line 100 extends upwardly from the T-fitting 98 to an air tight tank (not shown). The speed of operation of the packaging machine is correlated with the speed of operation of the sterilizing equipment for the liquid food product so that when the solenoid valve 96 is open the sterilized liquid food product is continuously supplied at the proper rate to fill the sterilized packages as they are being formed, the entire packaging process being continuous. When it is desired to stop the operation of the packaging machine, as when a new roll 17 of the laminate strip 18 is being applied to the machine, the solenoid valve 96 is closed and the sterilized food product being continuously delivered is diverted through the diversion pipe 100 to the air tight tank and by reason of the air tight tank, the diverted sterilized liquid food product is in no way contaminated. When the machine is placed in operation again, the solenoid valve 96 is opened to supply the sterilized liquid food product to the sterilized packages as they are being formed. The diversion pipe 100 is preferably made transparent, and the sterilizing equipment is operated at a speed with respect to the speed of operation of the packaging machine to maintain a level in the diversion pipe 100 of about 12 inches above the fitting 98. The speed operation of the sterilizing equipment is controlled by regulating the speed of operation of the homogenizer thereof and in this way uniform filling of the packages is assured. The solenoid valve 96 may be closed by a liquid level control rod 104 which extends downwardly inside of the paper like tube 29 to be contacted by the liquid food product in the event that the level thereof rises above a desired value. The liquid level control rod 104 is connected at 105 to operate conventional control equipment (not shown) for opening and closing the solenoid valve 96. The solenoid valve 96 may also be closed by a switch located adjacent the flexible paper like tube 29 so that if the paper tube 29 should be ruptured or should the supply of the paper like strip be exhausted, the solenoid valve 96 would close to shut off the supply of the sterilized liquid food product.

Also extending downwardly into the formable paper like tube 29 is a feed line 102 which is connected at 103 to a source of uncontaminated gas, such as nitrogen or the like, which is non-toxic and which does not react unfavorably with the food product or package. The uncontaminated gas, being heavier than air, impinges upon the sterilized liquid food product in the formable paper like tube 29 as it is filling the packages being formed. The uncontaminated gas also fills the paper like tube 29 and escapes upwardly therefrom. This effectively prevents the entrance of air into the paper like tube 29 and prevents contact of air with the surface of the liquid food product. The uncontaminated nitrogen gas operates effectively to strip any remaining oxygen from the liquid food product and the surplus uncontaminated gas creates an upward draft in the paper tube 29, which serves as a chimney for its discharge, so as to prevent the entrance of any airborne bacteria below the germicidal lamp 74. The warm air created by the heat from the germicidal lamp 74, in the partially formed tube, will have a tendency to rise and will also create an upward draft in the same direction as that taken by the surplus gas escaping from the formed tube. This also aids in preventing airborne bacteria from contacting the sterilized side of the laminate strip 18. Since the uncontaminated gas completely covers the sterilized liquid food product as it is being packaged, the packages, when sealed closed, may have nitrogen gas above the sterilized liquid food product therein, this nitrogen gas also having a further purging effect in the package.

The procedure for sterilizing the equipment of the aforementioned Roy R. Graves Patent No. 2,772,979 is to pump water through the system with the steam on in the stream heat exchanger and to measure the temperature of the water at progressive points in the operation until the water has reached a temperature of at least 300 degrees F. in the entire processing system. It may take from 25 to 35 minutes to attain this temperature throughout the system. While the water is still in the system, the water is turned off and the milk or other liquid food product is turned on, so that there is no cessation between the water flow and the food product flow. This necessitates the discarding of the intermediate flow which is part water and part food product. When the liquid food product is in full flow, the temperatures of the heat exchangers are adjusted downwardly to the desired temperature of sterilization. During the sterilization of the processing equipment, the steam and hot water are passed through the supply lines 99 and 95 and the filling line 33 and the steam and water emanating from the filling line 33 might cause damage to the equipment in the housing 11 of the packaging machine. This cleaning and sterilizing operation, of course, occurs when the packaging machine 10 is not in operation.

In accordance with this invention a pipe 107 is extended through an opening 109 in the housing 11 and is detachably secured at 108 to the lower end of the filling line 33 as indicated in FIG. 12. Thus, the hot water and steam, during sterilizing and cleaning of the equipment, is conveyed by the detachable pipe 107 to the exterior of the housing 11. Thus, during sterilization of the equipment and the conveying lines for the liquid food product, the hot water and steam goes forward through the solenoid diversion valve 96 into the feed line 33 and is discharged through the removable pipe 107 to the outside of the housing 11. While this sterilization is in process, the packaging machine is not in operation. At the conclusion of the sterilization period, the solenoid diversion valve 96 is closed and the hot water is by-passed through the diversion line 100 to the air tight storage tank. The removable pipe 107 is then detached from the lower end of the filling line 33 and removed. The packaging machine is then placed in operation and as soon as it starts forming sterilized packages, the solenoid valve 96 is opened and the sterilized food product is then supplied through the feeding line 33 to the packages as they are being formed. Because of the slippery nature of the polyethylene coated laminate strip 18, there is a tendency for it to slip sidewise in the roll 17. The discs or collars 19 effectively prevent any undue slipping and the tapered faces 20 thereof effectively guide the roll and strip without binding.

Referring now to the form of the invention illustrated in FIGS. 22 to 30, the packaging machine is generally designated at 10 and it corresponds to the packaging machine illustrated in FIG. 1, like reference characters being utilized for like parts. The formable paper like strip 18 is fed through the packaging machine 11 from a roll 17 carried at a supply station generally designated at 120. The roll 17 is carried by a shaft 123 suitably removably mounted in bearings 124 carried by a frame 121 having supporting legs 122. The formable paper like strip 18 extends from the roll 17 under a guide roller 125 over a supporting plate 126 carried by the frame 121, over a roll 127 and around a roll 128 carried by the frame 121, around a roll 129 and over a roll 130 carried by the packaging machine 11, and over the rolls 24 and 13 carried by the packaging machine 11 down to the forming rings 27 and 28 of the packaging machine.

Instead of applying the thermoplastic reinforcing tape 85 to the formable paper like strip 18 at the packaging machine as illustrated at FIGS. 1 and 4, the thermoplastic reinforcing tape is applied thereto at the supply station 120 as illustrated in FIGS. 22, 23, 26 and 28. Here, a roll 133 of the reinforcing thermoplastic tape 85 is carried by a bracket 132 carried by the frame 121, the tape 85 extending from the roll through a guide 135 and over a roll 136 and between rolls 137 and 138, the tape 85 engaging one edge of the bottom or thermoplastic coated side of the formable paper like strip 18 as shown more clearly in FIG. 28. In this connection, the formable paper like strip 18 is also passed between the rolls 137 and 138 and the tape 85 is secured thereto by heat sealing. In order to heat seal the tape 85 onto the strip 18, the edge of the strip is heated by a heater 140 having a heating element 141 arranged below the strip 18 and a guide 142 for maintaining the strip 18 against the heating element 141. In this way, the lower or thermoplastic coated surface of the edge of the formable paper like strip 18 is heated sufficiently so that when the thermoplastic reinforcing tape 85 is pressed thereagainst by the rolls 137 and 136, the reinforcing tape 85 is heat sealed to the edge of the strip 18.

As the formable paper like strip 18 with the reinforcing tape 85 applied thereto passes downwardly from the roll 127 to the roll 128, it passes by a spray shroud 144 suitably carried by the frame 121. The spray shroud 144 is provided with a nozzle 145 carried by a bracket 146 to which a sterilizing chemical is supplied by a pipe 147 and to which air under pressure is supplied by a pipe 148 under the control of a valve 149. In this way, the sterilizing chemical is sprayed by the nozzle against the polyethylene coated side of the formable paper like strip 18 and against the thermoplastic reinforcing tape 85. The sterilizing chemical may be of the type described above.

As the formable paper like strip 18 with its reinforcing tape 85 passes over the rolls 128, 129, 130, 24 and 13, sufficient time elapses to provide for substantially complete sterilization thereof by the sterilizing chemical. As shown more clearly in FIG. 25, a squeegee 151 is arranged upstream of the roller 139, as distinguished from the squeegee 73 arranged down stream thereof in FIG. 5, so that any possible drippings from the squeegee of excessive sterilizing chemical will not fall into the tube 29 formed by the forming rings 27 and 28.

The supply station 120, as shown more clearly in FIGS. 22, 23, 29, and 30 is provided with a quick splicing arrangement so that as the roll 17 of the formable paper like strip 18 is depleted, another strip 18a thereof may be readily spliced thereto. In this way, the packaging machine may be continuously operated without the need for shutting the same down when it becomes necessary to apply a new roll of the formable paper like strip thereto. In this connection, the additional paper like strip 18a is taken from a roll 17a carried by a shaft 123a removably mounted in bearings 124a which in turn are mounted on the frame 121. Arranged between the rolls 17 and 17a and removably mounted on the frame 121 is a transverse platform 153 which carries at one end by means of a shaft 155 a roll 154 of thermoplastic adhesive tape 156. The adhesive tape 156 with its adhesive side facing upwardly is pulled from the roll across the platform 153 and is held in place by a spring clamp 157. The leading edge of the formable paper like strip 18a is pressed on and adhesively secured to the tape 156 on the platform 153 as shown more clearly in FIG. 30. When the formable paper like strip 18 is substantially depleted from the roll 17, it is completely unwound from the roll and the trailing edge thereof is also pressed upon and adhesively secured to the adhesive tape 156, also as shown in FIG. 30. When the strips 18 and 18a are thus adhesively spliced together, the tape 156 is severed by means of a knife 158 carried by a bracket 159, the knife 158 being manipulated by a handle 160. At the same time, the spring clamp 157 is released and the strips 18 and 18A, therefore, form a substantially continuous strip. As the packaging machine 10 continues to operate, the slack in the continuous strip 18, 18a is taken up and then the spliced strip is fed from the roll 17a. The shaft 123 is then removed from the bearings 124 and the shaft 123a carrying the roll 17a is then transferred from the bearings 124a to the bearings 124. Such shifting of the roll 17a is greatly facilitated by removing the platform 153 during the shifting operation. A new roll of the formable paper like strip may then be placed in the bearings 124a so that another splicing operation may thereafter take place in the manner described above so as to provide further continuous operation of the packaging machine.

The manner of forming the longitudinal seam 34 in the tube 29 formed from the formable paper like strip 18, in accordance with this form of the invention, is illustrated in more detail in FIGS. 24 and 27. Here the lower forming ring 28 is provided with a cut out for rotatably receiving a curved roller 165 which is rotatably supported by pins 166 in the ringe 28. The spring pressed roller 31 carried by the spring bracket 32 is lowered and arranged adjacent the roller 165. The roller 31 is shaped and provided with a shoulder 167 so as to conform to the shape of the longitudinal seam 34 in the tube 29. The longitudinal seam 34 is heated by the heater 30 and as it passes between the rollers 165 and 31, it is uniformly pressed thereby to form a uniform and leakproof longitudinal seam without any wrinkles, creases or the like, as shown in FIG. 27. Preferably, the rollers 165 and 31 are formed of Teflon or the like.

As shown in FIG. 24, the pipe 107 which is utilized during sterilizing and cleaning of the equipment is detachably secured to the lower end of the filling pipe 133 by a bayonet type connector 170 provided with handles 171 and the discharge end of the pipe 107 is provided with a pressure regulating valve 172. The pressure regulating valve 172 is set so as to maintain a sufficient pressure in the pipe 107 and the feed line 33 so that the saturated steam therein during sterilizing and cleaning will have a sterilizing temperature. For example, the pressure regulating valve may be set to maintain a pressure in the pipes 107 and 33 of 40 pounds per square inch to obtain a temperature in said pipes of up to 280 and 290 degrees F. The bayonet connection 180 allows these pressures to be maintained during sterilizing and cleaning and when the sterilizing and cleaning operation is completed, the bayonet type connector 170 may be readily released by tapping on the handles 171 with a bar or the like to allow removal of the pipe 107 and this can all be done at high sterilizing temperatures.

The sterilizing or heat treating equipment for the food product is diagrammatically illustrated in FIG. 22, it preferably including a mixing tank 175, a variable speed pump 176, a preheater or regenerator 177, a deaerator 178, an adjustable homogenizer 179, a heat exchanger 180 and a cooler 181 all connected in series with a food product supply line 99. The T fitting 98 is provided with a glass riser 182 which is connected by the return or diversion pipe 100 to a pressure regulating valve 183 which empties into the mixing tank 175 during the sterilizing of the food product and which empties into the drain when the sterilizing equipment is being cleaned and sterilized. The food product supply line 99 is connected to the filling line 33 by the diversion valve 96 controlled by the solenoid 97. An anti-surge riser 134 provided with a bleed valve 185 is also connected to the food product supply line 99. The solenoid 97 of the diversion valve 96 is controlled as explained above by the probe 104 of the liquid level controller.

When the diversion valve 96 is open and the volume of the food product being processed is equal to the volume being packaged, no food product will go through the return or diversion line 100. In practice, the variable speed motors on the homogenizer 179 and pump 176 are adjusted at a rate to fit the flow of the sterilized food product to the capacity of the packaging machine. When the food product can be seen in the glass riser 182, the packaging machine is being fed to capacity. When the diversion valve is closed, as when the lines are being presterilized, when the product passes through the riser 182, the diversion line 100 and the pressure regulating valve 183 to the drain. This pressure regulating valve 183 is preferably set at 40 pounds per square inch which allows sterilizing temperatures of some 286 degrees F. to be maintained in the lines for pre-sterilization purposes. When operating with the food product, any discharge from this pressure regulating valve 183 which is then set for about 10 pounds per square inch is directed back into the mixing tank 175. This pressure regulating valve 183 serves to keep the line full of product and prevents the entrance of air into the diversion line from the discharge end. The solenoid operated diversion valve 96 is so hooked up electrically that the diversion valve can be kept continuously open for forward flow or continuously closed for diverted flow, as in pre-sterilization of all lines, but when the food product is actually being packaged, it acts as a liquid level control valve for the food product in the tube 29. Actually, when packaging is under way, the diversion valve 96 opens and closes some 40 times a minute. Since the flow of the food product is constantly forward, the closing of the diversion valve 96 causes a sudden damming of the stream that causes a backward surge in the food product supply line 99. The glass riser 182 can not always absorb this pulsation because it is normally from ½ to ⅘ full of the food product. This backward surge resulting from the closing of the diversion valve 96 is absorbed in the riser 184 and all vibration in the lines is eliminated. The valve 185 mounted on the head of the riser 184 is cracked while the lines are being sterilized so that steam escapes through the valve and promotes circulation in the riser. Following pre-sterilization, the valve 185 is closed and if this results in vibration by reason of entrapped air in the riser 184, the valve 185 is momentarily opened to permit the air to escape so that there will be no more vibration.

Referring again to FIG. 24, the non-toxic and non-reacting gas, such as nitrogen or the like, is supplied through pipes 103 and 102 to a point above the food product in the tube 29 so as to blanket the surface thereof and to prevent contact of the food product with air. This gas also causes an upward current within the tube 29 which prevents the entrance of air therein. The gas must be uncontaminated and, therefore, it is necessary to remove any bacteria from the gas before it is supplied to the surface of the food product in tube 29. One simple method of so sterilizing the gas is to pass it from a supply line 191 through a cylindrical container 190 to the gas feed line 105. The container 190 is filled with laboratory filtering type glass wool and bacteria in the gas is filtered out by the glass wool before it enters the packaging machine. A steam connection 192 is provided for the purpose of steaming the filter type glass wool before the starting of a run to kill any bacteria that might have been filtered out in a prior run. This makes it unnecessary to remove or replace the filtering glass wool for long periods of time.

In order to further protect the packaging machine against contamination, it is preferably provided with a flexible plastic cover 195 which effectively prevents airborne bacteria from contaminating the packaging material, and this is especially so since the interior of the cover 195 will be substantially filled with the uncontaminated gas. Aside from the aforementioned differences, the form of the invention illustrated in FIGS. 22 to 30 operates in substantially the same manner as the form of the invention illustrated in FIGS. 1 to 21 and, accordingly, a further description of the operation thereof is not considered necessary.

While for purposes of illustration, two forms of this invention have been disclosed, other forms thereof may become apparent to those skilled in the art upon reference to this disclosure and, therefore, this invention is to be limited only by the scope of the appended claims.

I claim as my invention:

1. In a machine for continuously aseptically packaging in gas and liquid impervious formable type packages for long time keeping without refrigeration a sterilized liquid food product having low oxygen content and which is subjected to deterioration upon contact with extraneous oxygen, and including a vertical frame having a guide roll at its top, a supply roll at one side of the frame adjacent the bottom thereof for supplying a gas and liquid impervious formable type strip up said one side of the frame, over the guide roll and down the other side of the frame, forming means on said other side of the frame adjacent the bottom thereof for forming and longitudinally sealing the downwardly extending strip into a sealed tube with the inner frame facing side of the strip forming the inside of the tube, transverse sealing means below the forming means for continuously advancing the strip and tube and for transversely sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a germicidal lamp carried by the frame and directing sterilizing rays on the inner frame facing side of the continuously descending strip, and means for supplying uncontaminated gas which is non-toxic and which does not react unfavorably with the food product and the packages to and above the sterilized liquid food product in the advancing tube to prevent contaminated air from contacting the sterilized liquid food product and from entering and contacting the sterilized interior of the tube.

2. In a machine for continuously aseptically packaging in gas and liquid impervious formable type packages for long time keeping without refrigeration a sterilized liquid food product having low oxygen content and which is subject to deterioration upon contact with extraneous oxygen, and including a vertical frame having a guide roll at its top, a supply roll at one side of the frame adjacent the bottom thereof for supplying a gas and liquid impervious formable type strip up said one side of the frame, over the guide roll and down the other side of the frame, forming means on said other side of the frame adjacent the bottom thereof for forming and longitudinally sealing the downwardly extending strip into a sealed tube with the inner frame facing side of the strip forming the inside of the tube, transverse sealing means below the forming means for continuously advancing the strip and tube and for transversely sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a squeegee adjacent the guide roll and engaging the inner frame facing side of the continuously advancing strip for removing excess sterilizing chemical therefrom, a germicidal lamp carried by the frame and directing sterilizing rays on the inner frame facing side of the continuously descending strip, and means for supplying uncontaminated gas which is non-toxic and which does not react unfavorably with the feed product and the packages to and above the sterilized liquid food product in the advancing tube to prevent contaminated air from contacting the sterilized liquid food product and from entering and contacting the sterilized interior of the tube.

3. In a machine for continuously aseptically packaging in gas and liquid impervious formable type packages for long time keeping without refrigeration a sterilized liquid food product having low oxygen content and which is subject to deterioration upon contact with extraneous oxygen, and including a vertical frame having a guide roll at its top, a supply roll at one side of the frame adjacent the bottom thereof for supplying a gas and liquid impervious formable type strip up said one side of the frame, over the guide roll and down the other side of the frame, forming means on said other side of the frame adjacent the bottom thereof for forming and longitudinally sealing the downwardly extending strip into a sealed tube with the inner frame facing side of the strip forming the inside of the tube, transverse sealing means below the forming means for continuously advancing the strip and tube and for transversely sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a germicidal lamp carried by the frame and directing sterilizing rays on the inner frame facing side of the continuously descending strip, means adjacent the germicidal lamp for directing hot air against the edges of the continuously descending strip for heating and drying the same to facilitate the sealing of the strip into the continuously advancing tube, and means for supplying uncontaminated gas which is non-toxic and which does not react unfavorably with the food product and the packages to and above the sterilized liquid food product in the advancing tube to prevent contaminated air from contacting the sterilized liquid food product and from entering and contacting the sterilized interior of the tube.

4. In a machine for continuously aseptically packaging in gas and liquid impervious formable type packages for long time keeping without refrigeration a sterilized liquid food product having low oxygen content and which is subject to deterioration upon contact with extraneous oxygen, and including a vertical frame having a guide roll at its top, a supply roll at one side of the frame adjacent the bottom thereof for supplying a gas and liquid impervious formable type strip up said one side of the frame, over the guide roll and down the other side of the frame, forming means on said other side of the frame adjacent the bottom thereof for forming and longitudinally sealing the downwardly extending strip into a sealed tube with the inner frame facing side of the strip forming the inside of the tube, transverse sealing means below the forming means for continuously advancing the strip and tube and for transversely sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a squeegee adjacent the guide roll and engaging the inner frame facing side of the continuously advancing strip for removing excess sterilizing chemical therefrom, a germicidal lamp carried by the frame and directing sterilizing rays on the inner frame facing side of the continuously descending strip, means adjacent the germicidal lamp for directing hot air against the edges of the continuously descending strip for heating and drying the same to facilitate the sealing of the strip into the continuously advancing tube, and means for supplying uncontaminated gas which is non-toxic and which does not react unfavorably with the food product and the packages to and above the sterilized liquid food product in the advancing tube to prevent contaminated air from contacting the sterilized liquid food product and from entering and contacting the sterilized interior of the tube.

5. In a machine for continuously aseptically packaging in gas and liquid impervious formable type packages for long time keeping without refrigeration a sterilized liquid food product having low oxygen content and which is subject to deterioration upon contact with extraneous oxygen, and including a vertical frame having a guide roll at its top, a supply roll at one side of the frame adjacent the bottom thereof for supplying a gas and liquid impervious thermoplastic coated formable type strip up one side of the frame, over the guide roll and down the other side of the frame, forming means on said other side of the frame adjacent the bottom thereof for overlapping the edges of the downwardly extending strip to form a tube with the inner frame facing side of the strip forming the inside of the tube and including longitudinal heat sealing means for heat sealing the overlapping edges of the strip to seal the tube, transverse heat sealing means below the forming means for continuously advancing the strip and the tube and for transversely heat sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a germicidal lamp carried by the frame and directing sterilizing rays on the inner frame facing side of the continuously descending strip, means adjacent the germicidal lamp for directing hot air against the edges of the continuously descending strip for heating and drying the same to facilitate the longitudinal heat sealing thereof by the longitudinal heat sealing means, and means for supplying uncontaminated gas which is non-toxic and which does not react unfavorably with the food product and the packages to and above the sterilized liquid food product in the advancing tube to prevent contaminated air from contacting the sterilized liquid food product and from entering and contacting the sterilized interior of the tube.

6. In a machine for continuously aseptically packaging in gas and liquid impervious formable type packages for long time keeping without refrigeration a sterilized liquid food product having low oxygen content and which is subject to deterioration upon contact with extraneous oxygen, and including a vertical frame having a guide roll at its top, a supply roll at one side of the frame adjacent the bottom thereof for supplying a gas and liquid impervious thermoplastic coated formable type strip up said one side of the frame, over the guide roll and down the other side of the frame, forming means on said other side of the frame adjacent the bottom thereof for overlapping the edges of the downwardly extending strip to form a tube with the inner frame facing side of the strip forming the inside of the tube and including longitudinal heat sealing means for heat sealing the overlapping edges of the strip to seal the tube, transverse heat sealing means below the forming means for continuously advancing the strip and the tube and for transversely heat sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a gemicidal lamp carried by the frame and directing sterilizing rays on the inner frame facing side of the continuously descending strip, means for applying a narrow thermoplastic tape along one edge of the inner frame facing side of the continuously advancing thermoplastic coated strip so as to be incorporated in the longitudinal heat seal by the longitudinal heat sealing means to reinforce the same, and means for supplying uncontaminated gas which is non-toxic and which does not react unfavorably with the food product and the packages to and above the sterilized liquid food product in the advancing tube to prevent contaminated air from contacting the sterilized liquid food product and from entering and contacting the sterilized interior of the tube.

7. In a machine for continuously aseptically packaging in gas and liquid impervious formable type packages for long time keeping without refrigeration a sterilized liquid food product having low oxygen content and which is subject to deterioration upon contact with extraneous oxygen, and including a vertical frame having a guide roll at its top, a supply roll at one side of the frame adjacent the bottom thereof for supplying a gas and liquid impervious thermoplastic coated formable type strip up said one side of the frame, over the guide roll and down the other side of the frame, forming means on said other side of the frame adjacent the bottom thereof for overlapping the edges of the downwardly extending strip to form a tube with the inner frame facing side of the strip forming the inside of the tube and including longitudinal heat sealing means for heat sealing the overlapping edges of the strip to seal the tube, transverse heat sealing means below the forming means for continuously advancing the strip and the tube and for transversely heat sealing at intervals the continuously advancing tube to progressively form gas and liquid impervious type sealed packages, and means within the tube for continuously filling the packages as they are formed with the sterilized liquid food product, in combination therewith, means adjacent the supply roll for applying a sterilizing chemical on the inner frame facing side of the continuously advancing strip, a germicidal lamp carried by the frame and directing sterilizing rays on the inner frame facing side of the continuously descending strip, means adjacent the germicidal lamp for directing hot air against the edges of the continuously descending strip for heating and drying the same to facilitate the longitudinal heat sealing thereof by the longitudinal heat sealing means, means for applying a narrow thermoplastic tape along one edge of the inner frame facing side of the continuously advancing thermoplastic coated strip so as to be incorporated in the longitudinal heat seal by the longitudinal heat sealing means to reinforce the same, and means for supplying uncontaminated gas which is non-toxic and which does not react unfavorably with the food product and the packages to and above the sterilized liquid food product in the advancing tube to prevent contaminated air from contacting the sterilized liquid food product and from entering and contacting the sterilized interior of the tube.

8. In a machine for packaging a liquid food product in a formable type package including means for continuously forming packages from formable type strip supplied in roll form, and means for continuously filling the packages as they are formed with the liquid food product, in combination therewith, means for removably and rotatably supporting in one position a first roll of said formable type strip which is being continuously used for forming said packages, means for removably and rotatably supporting a second roll of said formable type strip in another position adjacent the first roll, a platform intermediate said first and second rolls, means for supporting an adhesive tape on the platform for adhesively securing the leading end of the formable type strip of the second roll thereto and for adhesively securing the trailing end of the formable type strip of the first roll thereto when said roll is substantially depleted for adhesively splicing the strips of the first and second rolls, said second roll being thereafter shifted from its position to the position of the depleted first roll for continuously forming said packages.

9. In a machine for packaging a liquid food product in a formable type package including means for continuously forming packages from a formable type strip supplied in roll form, and means for continuously filling the packages as they are formed with the liquid food product, in combination therewith, means for removably and rotatably supporting in one position a first roll of said formable type strip which is being continuously used for forming said packages, means for removably and rotatably supporting a second roll of said formable type strip in another position adjacent the first roll, a platform intermediate said first and second rolls and having a roll of adhesive tape at one end thereof, means for removably holding adhesive tape withdrawn from the roll thereof on said platform for adhesively securing the leading end of the formable type strip of the second roll thereto and for adhesively securing the trailing edge of the formable type strip of the first roll thereto when said roll is substantially depleted for adhesively splicing the strips of the first and second rolls, and knife means for severing the adhesive strip from its roll, said second roll after splicing being shifted from its position to the position of the depleted first roll for continuously forming said packages.

10. In a machine for packing a liquid food product in a formable type package including means for continuously forming packages from a formable type strip supplied in roll form, and means for continuously filling the packages as they are formed with the liquid food product, in combination therewith, a frame arranged adjacent the packaging machine, means for removably and rotatably supporting on said frame in one position a first roll of said formable type strip which is being continuously used for forming said packages, means for removably and rotatably supporting on said frame a record roll of said formable type strip in another position adjacent said first roll, a platform removably mounted on said frame between said first and second rolls, means for supporting an adhesive tape on the platform for adhesively securing the leading end of the formable type strip of the second roll thereto and for adhesively securing the trailing end of the formable type strip of the first roll thereto when said roll is substantially depleted for adhesively splicing the strips of the first and second rolls, said platform being removable to facilitate shifting of the second roll from its position to the position of the depleted first roll for continuously forming said packages.

11. In a machine for packaging a liquid food product in a formable type package including means for continuously forming packages from a formable type strip supplied in roll form, and means for continuously filling the packages as they are formed with the liquid food product, in combination therewith, a frame arranged adjacent the packaging machine, means for removably and rotatably supporting on said frame in one position a first roll of said formable type strip which is being continuously used for forming said packages, means for removably and rotatably supporting on said frame a second roll of said formable type strip in another position adjacent said first roll, a platform removably mounted on said frame between said first and second rolls and having a roll of adhesive tape at one end thereof, means for removably holding adhesive tape withdrawn from the roll thereof on said platform for adhesively securing the leading end of the formable type strip of the second roll thereto and for adhesively securing the trailing edge of the formable type strip of the first roll thereto when said roll is substantially depleted for adhesively splicing the strips of the first and second rolls, and knife means for severing the adhesive strip from its roll, said platform being removable to facilitate shifting of the second roll from its position to the position of the depleted first roll for continuously forming said packages.

12. In a machine for packaging a liquid food product in a thermoplastic coated formable type package including means for continuously feeding a thermoplastic coated formable type strip from a roll thereof, forming means for overlapping the edges of the strip to continuously form a tube with the thermoplastic coating on the inside, longitudinal heat sealing means for heat sealing the overlapping edges of the strip to longitudinally seal the tube, transverse heat sealing means for transversely heat sealing at intervals the continuously advancing tube to progressively form thermoplastic coated sealed packages, and means within the tube for continuously filling the packages as they are formed with the liquid food product, in combination therewith, a frame arranged adjacent the packaging machine, means rotatably supporting on said frame a roll of said thermoplastic coated formable type strip which is being continuously used for forming said packages, and means carried by said frame for heat sealing a narrow thermoplastic tape along one edge of the thermoplastic coated side of the continuously advancing formable type strip so as to be incorporated in the longitudinal heat seal on the inside of the tube by the longitudinal heat sealing means to reinforce the same, and means carried by the frame for applying a sterilizing chemical on the thermoplastic coated side of the continuously advancing formable type strip and the thermoplastic tape heat sealed thereto.

13. In a machine for packaging a liquid food product in a thermoplastic coated formable type package including means for continuously feeding a thermoplastic coated formable type strip from a roll thereof, forming means for overlapping the edges of the strip to continuously form a tube with the thermoplastic coating on the inside, longitudinal heat sealing means for heat sealing the overlapping edges of the strip to longitudinally seal the tube, transverse heat sealing means for transversely heat sealing at intervals the continuously advancing tube to progressively form thermoplastic coated sealed packages, and means within the tube for continuously filling the packages as they are formed with the liquid food product, in combination therewith, a frame arranged adjacent the packaging machine, means for removably and rotatably supporting on said frame in one position a first roll of said thermoplastic coated formable type strip which is being continuously used for forming said packages, means for removably and rotatably supporting on said frame a second roll of said thermoplastic coated formable type strip in another position adjacent said first roll, a platform mounted on said frame between said first and second rolls, means for supporting an adhesive tape on the platform for adhesively securing the leading end of the formable type strip of the second roll thereto and for adhesively securing the trailing end of the formable type strip of the first roll thereto when said roll is substantially depleted for adhesively splicing the strips of the first and second rolls, said second roll being thereafter shifted from its position to the position of the depleted first roll for continuously forming said packages, and means carried by said frame for heat sealing a narrow thermoplastic tape along one edge of the thermoplastic coated side of the continuously advancing formable type strip so as to be incorporated in the longitudinal heat seal on the inside of the tube by the longitudinal heat sealing means to reinforce the same.

14. In a machine for packaging a liquid food product in a thermoplastic coated formable type package including means for continuously feeding a thermoplastic coated formable type strip from a roll thereof, forming means for overlapping the edges of the strip to continuously form a tube with the thermoplastic coating on the inside, longitudinal heat sealing means for heat sealing the overlapping edges of the strip to longitudinally seal the tube, transverse heat sealing means for transversely heat sealing at intervals the continuously advancing tube to progressively form thermoplastic coated sealed packages, and means within the tube for continuously filling the packages as they are formed with the liquid food product, in combination therewith, a frame arranged adjacent the packaging machine, means for removably and rotatably supporting on said frame in one position a first roll of said thermoplastic coated formable type strip which is being continuously used for forming said packages, means for removably and rotatably supporting on said frame a second roll of said thermoplastic coated formable type strip in another position adjacent said first roll, a platform mounted on said frame between said first and second rolls, means for supporting an adhesive tape on the platform for adhesively securing the leading end of the formable type strip of the second roll thereto and for adhesively securing the trailing end of the formable type strip of the first roll thereto when said roll is substantially depleted for adhesively splicing the strips of the first and second roll, said second roll being thereafter shifted from its position to the position of the depleted first roll for continuously forming said packages, means carried by said frame for heat sealing a narrow thermoplastic tape along one edge of the thermoplastic coated side of the continuously advancing formable type strip so as to be incorporated in the longitudinal heat seal on the inside of the tube by the longitudinal heat sealing means to reinforce the same, and means carried by the frame for applying a sterilizing chemical on the thermoplastic coated side of the continuously advancing formable type strip and the thermoplastic tape heat sealed thereto.

References Cited in the file of this patent

UNITED STATES PATENTS

| | | |
|---|---|---|
| 2,307,890 | Lakso | Jan. 12, 1943 |
| 2,738,631 | Jarund | Mar. 20, 1956 |
| 2,741,079 | Rausing | Apr. 10, 1956 |
| 2,767,535 | Bentley | Oct. 23, 1956 |
| 2,816,837 | Holsman | Dec. 17, 1957 |

FOREIGN PATENTS

| | | |
|---|---|---|
| 155,018 | Australia | Feb. 3, 1954 |